United States Patent
Kennedy (10) Patent No.: US 10,142,437 B2
(45) Date of Patent: Nov. 27, 2018

(54) PRIORITISING SIP MESSAGES

(71) Applicant: Metaswitch Networks Limited, Enfield (GB)

(72) Inventor: Steven Kennedy, Enfield (GB)

(73) Assignee: Metaswitch Networks Limited, Hatfield, Hertfordshire (GB)

( * ) Notice: Subject to any disclaimer, the term of this patent is extended or adjusted under 35 U.S.C. 154(b) by 0 days.

(21) Appl. No.: 15/232,424

(22) Filed: Aug. 9, 2016

(65) Prior Publication Data
US 2017/0054642 A1    Feb. 23, 2017

(51) Int. Cl.
| | |
|---|---|
| H04L 29/08 | (2006.01) |
| H04L 29/06 | (2006.01) |
| H04L 12/851 | (2013.01) |
| H04L 12/801 | (2013.01) |

(52) U.S. Cl.
CPC ...... *H04L 67/2842* (2013.01); *H04L 47/2433* (2013.01); *H04L 65/1006* (2013.01); *H04L 65/1063* (2013.01); *H04L 65/1073* (2013.01); *H04L 47/34* (2013.01)

(58) Field of Classification Search
CPC ............. H04L 67/2842; H04L 47/2433; H04L 65/1006; H04L 65/1063; H04L 65/1073; H04L 47/34
See application file for complete search history.

(56) References Cited

U.S. PATENT DOCUMENTS

| | | | |
|---|---|---|---|
| 2005/0163126 A1 | 7/2005 | Bugenhagen et al. | |
| 2006/0250993 A1* | 11/2006 | Shin ................... | H04L 29/06027 370/261 |
| 2007/0206620 A1 | 9/2007 | Cortes et al. | |
| 2007/0253412 A1* | 11/2007 | Batteram .......... | H04L 29/06027 370/389 |
| 2008/0031258 A1 | 2/2008 | Acharya et al. | |
| 2010/0316045 A1 | 12/2010 | Przybysz et al. | |
| 2014/0006632 A1* | 1/2014 | Evens ................... | H04L 65/605 709/227 |

OTHER PUBLICATIONS

Intellectual Property Office, GB Search Report for Application No. GB1514924.8, dated Jan. 14, 2016, 3 pages.

* cited by examiner

*Primary Examiner* — Pao Sinkantarakorn
*Assistant Examiner* — Kabir U Jahangir
(74) *Attorney, Agent, or Firm* — Stetina Brunda Garred & Brucker (57) ABSTRACT

Multiple session initiation protocol (SIP) devices connected to a server via a network may attempt to initiate a process (such as SIP registration) at approximately the same time as each other, by sending SIP messages (e.g. "REGISTER" messages) towards the server substantially simultaneously. Depending on the number of devices and the resources of the server, the server may not be able to process all of the messages without crashing. An interposed network element, such as a session border controller (SBC), may prevent some of the messages from reaching the server, to stop the server from crashing. However, some messages may be of higher priority than others. The invention provides a way of differentiating between messages to assist in prioritising messages with higher priority over others.

13 Claims, 4 Drawing Sheets

PRIORITISING SIP MESSAGES

CROSS-REFERENCE TO RELATED APPLICATIONS

The present application claims priority to GB1514924.8 filed Aug. 21, 2015, the entirety of the disclosure of which is expressly incorporated herein by reference.

STATEMENT RE: FEDERALLY SPONSORED RESEARCH/DEVELOPMENT

Not Applicable

FIELD OF THE INVENTION

This invention relates to prioritising session initiation protocol (SIP) messages. In particular, it relates to determining priorities of SIP messages sent by devices, using opaque parameters of the SIP messages.

BACKGROUND OF THE INVENTION

A power cut or other event may cause a large number of SIP devices (i.e. devices which use SIP, such as VoIP phones) in a network to be disconnected from a central network resource such as a server running a SIP registration application ("registrar"). Following the power cut, each of those devices may attempt to send one or more messages of a similar kind to the central resource. For example, once power has been restored, some or all of the SIP devices in the network may send a SIP "REGISTER" message towards the registrar in the network, at approximately the same time, to begin SIP registration processes for the devices. The large number of messages sent towards the registrar at approximately the same time may be referred to as a "storm" of messages.

Depending on the number of SIP devices and the resources available, the registrar might not be able to process all of the incoming REGISTER messages. This might lead to the registrar becoming overloaded and crashing, and/or to one or more of the incoming REGISTER messages not being responded to. In such circumstances, the SIP devices may re-transmit their respective REGISTER messages, exacerbating the problem by generating yet more messages.

To try to prevent crashing of the registrar, an intervening network element, such as a session border controller ("SBC"), might prevent or delay one or more of the REGISTER messages from reaching the registrar. The SBC may, for instance, forward only a certain number of register messages to the registrar in a period of time. This may mean that only 10% (for example) of the REGISTER messages sent by the SIP devices reach the registrar. If the SBC is correctly configured, the number of REGISTER messages that it allows through should be sufficiently small that the registrar is able to process them all without crashing.

SIP registration (like other SIP processes) can involve authentication of the device seeking to register. This may mean that a device sends a first SIP REGISTER message towards the registrar, and then a second REGISTER message in response to an authentication "challenge" message from the registrar. The "challenge" from the registrar may comprise a "401" message, or a similar kind of SIP response, including authentication information for the device to use in future. The second REGISTER message sent by the device uses the authentication information from the challenge message to authenticate the device at the registrar. This may prevent unauthorized devices from completing a registration process, but means that every device has to send two REGISTER messages rather than one to complete a registration process.

The second REGISTER message from the device must reach the registrar in order for registration of the device to be complete. If the first REGISTER from the device is allowed through by the SBC, but the second REGISTER from the device is not allowed through by the SBC, the registration process will fail, reducing the number of successful registrations. Thus, if the SBC cannot discriminate between first REGISTER messages and second REGISTER messages, it may be that, in the example discussed above, the SBC allows through only 10% of second REGISTER messages, leading to successful registration of only 1% (i.e. 10% of 10%) of devices requesting registration. This may lead to unacceptable delays in registration of SIP devices, and to unnecessarily high numbers of packets being sent over a network, as some devices re-send their second REGISTER messages one or more times to complete their respective registration processes.

The invention aims to go at least some way towards solving the problems identified above.

DISCLOSURE OF THE INVENTION

Accordingly, there is provided a method for prioritising forwarding of SIP messages in a network element, comprising the steps of: reading an opaque parameter of a received SIP message; determining a priority of the received SIP message based on the opaque parameter of the received SIP message; and controlling forwarding of the received SIP message based on the determined priority. The method may help the network element determine whether to forward the received SIP message to a further network element. Advantageously, this may help the network element control the forwarding of received SIP messages to prevent the further network element from being overloaded with SIP messages it cannot process.

In some embodiments, determining the priority of the received SIP message involves using the opaque parameter and a further parameter of the received SIP message. Preferably, determining the priority of the received SIP message involves using the outcome of a comparison which is based on the opaque parameter and the further parameter. Advantageously, using parameters of a received SIP message to determine the received SIP message may allow the network element to determine the priority of the received SIP message without referring to any other information, e.g. without referring to a list of priorities saved at the network element or elsewhere. This may improve the network element's ability to control and prioritise forwarding of received SIP messages, e.g. by reducing the time taken for determining a priority of a received SIP message.

Preferably, the comparison comprises comparing two of: the opaque parameter; the further parameter; an outcome of an operation performed on the opaque parameter; and an outcome of an operation performed on the further parameter. Such a comparison may determine whether one of a set of expected relationships exists between the opaque parameter and the further parameter (or their derivatives under the operations discussed above). If an expected relationship is determined to exist between an opaque parameter and a further parameter of a received SIP message, a priority of the message may be determined based on the relationship.

In preferred embodiments, the further parameter is a CSeq number of the received SIP message. Using the CSeq number of a received SIP message is advantageous because all SIP messages have CSeq numbers. Using the CSeq number may therefore increase the efficiency of the method, because the number of additional pieces of information that a SIP message must carry in order for its priority to be determined by the network element using the method described above is minimized.

Preferably, the opaque parameter is related to one or more of: a CSeq number of the received SIP message; and a CSeq number of a previously received SIP message. A relationship between the opaque parameter and a CSeq number of the received SIP message or a CSeq number of a previously received SIP message may improve the efficiency of the method by ensuring the information needed for determining a priority of a received SIP message is contained within the SIP message but afford flexibility in the number of relationships that can be present between the opaque parameter and the further parameter.

Optionally, the method further comprises determining whether to cache the received SIP message based on the priority of the received SIP message. Advantageously, the option to cache a received SIP message increases the network element's options for controlling forwarding of the received message. For example, the network element may, when it has determined the priority of a received SIP message, be able to: forward the received SIP message; cache the received SIP message (e.g. for possible forwarding at a later time); or discard the received SIP message. This may improve the network element's ability to prioritise forwarding of received SIP messages.

Preferably, the method further comprises controlling forwarding of a plurality of received SIP messages based on priorities of the received SIP messages. The network element may be able to control the forwarding of multiple SIP messages it receives based on priorities it determines of the multiple received SIP messages. This may enable the network element to control storms of received SIP messages, e.g. in circumstances where a large number of other network elements need to perform a process involving sending one or more messages to and/or receiving one or more messages from a further network element. The other network elements may all send one or more messages towards the further network element. These may be received by the network element performing the method for prioritising forwarding of received SIP messages, which may then determine priorities of the received SIP messages and forward, cache or discard individual messages among the received SIP messages based on the determined priorities.

In some embodiments, the method further comprises applying an opaque parameter to an outbound SIP message based on a CSeq number of the outbound SIP message. Applying an opaque parameter to a SIP message based on a CSeq number of the SIP message may advantageously mean that the network element can apply the opaque parameter with reference only to the CSeq number of the SIP message, and that a relationship between that CSeq number and that opaque parameter will be determinable by the network element at a later time, e.g. if it receives a SIP message including a CSeq number which is related to the CSeq number of the outbound SIP message and an opaque parameter which is the same as or related to the opaque parameter of the outbound SIP message.

In preferred embodiments, the method may be performed by a session border controller.

According to another embodiment of the invention there is provided an apparatus for prioritising forwarding of SIP messages, including: a reader arranged to read an opaque parameter of a received SIP message; a determiner arranged to determine a priority of the received SIP message based on the opaque parameter of the received SIP message; and a controller arranged to control forwarding of the received SIP message based on the determined priority.

Preferably, the determiner is arranged to determine the priority of the received SIP message using the opaque parameter and a further parameter of the received SIP message. The determiner may be arranged to determine the priority of the received SIP message using the outcome of a comparison which is based on the opaque parameter and the further parameter. The comparison may comprise comparing two of: the opaque parameter; the further parameter; an outcome of an operation performed on the opaque parameter; and an outcome of an operation performed on the further parameter.

Preferably, the further parameter is a CSeq number of the received SIP message. Further preferably, the opaque parameter is related to one or more of: a CSeq number of the received SIP message and a CSeq number of a previously received SIP message.

In some embodiments, the apparatus may further comprise a cache, and the apparatus may be arranged to determine whether to cache the received SIP message based on the priority of the received SIP message.

Advantageously, the controller may be arranged to control forwarding of a plurality of received SIP messages based on priorities of the received SIP messages.

Preferably, the apparatus is further arranged to apply an opaque parameter to an outbound SIP message based on a further parameter of said outbound SIP message, wherein the further parameter of said outbound SIP message is a CSeq number of the outbound SIP message.

In preferred embodiments, the apparatus is a session border controller.

According to another embodiment of the invention there is provided a computer program for execution by a network element, said computer program causing the network element to carry out a method for prioritising forwarding of SIP messages, comprising the steps of: reading an opaque parameter of a received SIP message; determining a priority of the received SIP message based on the opaque parameter of the received SIP message; and controlling forwarding of the received SIP message based on the determined priority.

According to a further embodiment of the invention there is provided a non-transitory computer-readable storage medium encoded with instructions which, when executed by a processor, enable a network element to carry out a method for prioritising forwarding of SIP messages, comprising the steps of: reading an opaque parameter of a received SIP message; determining a priority of the received SIP message based on the opaque parameter of the received SIP message; and controlling forwarding of the received SIP message based on the determined priority.

DESCRIPTION OF THE FIGURES

The present invention will now be described in more detail with reference to specific examples, in which.

DETAILED DESCRIPTION

Figure 1:
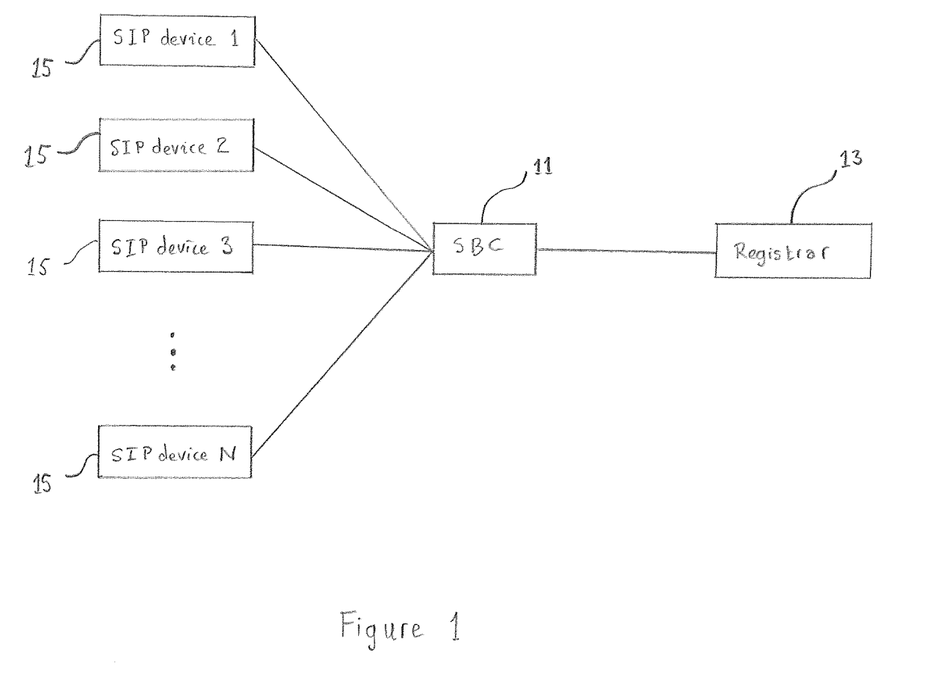
FIG. 1 schematically illustrates a plurality of SIP devices, a session border controller (SBC) and a registrar, which are connected via a network.

In the example of FIG. 1, a number N of SIP devices 15 are connected, over a network, to a session border controller (SBC) 11 and a registrar 13. In the illustrated example, the SIP devices 15 are VoIP phones which can be used for making and receiving calls and which use SIP to initiate and manage call sessions. The registrar 13 is a SIP registration application running on a server, which keeps a record of registered SIP devices in the network. The SBC 11 is topologically interposed between the server on which the registrar 13 runs and the N SIP devices 15.

The SIP devices 15 communicate with the registrar 13 over the network by exchanging packets with the server on which the registrar 13 is located, via the SBC 11. Packets may include SIP messages (or "methods") such as "REGISTER" messages, "401" responses, "200" responses, "SUBSCRIBE" messages, or other SIP messages which may be exchanged between a SIP device and a SIP server.

A power cut causes the N SIP devices 15 to be without power for a period of time. When the power supply is reinstated, all of the N SIP devices 15 begin a boot-up procedure which includes a registration process. The registration process includes sending a SIP "REGISTER" message towards the registrar 13, to initiate a SIP registration process for the respective device.

In this example, the N SIP devices 15 begin and carry out their respective boot-up procedures at approximately the same time as each other. Consequently, N SIP "REGISTER" messages are sent towards the registrar 13 at approximately the same time.

The processing resources of the registrar 13 are limited. The registrar 13 can only handle a certain number M of registration processes simultaneously or in a given period of time without crashing. In this example, M<N. The SBC 11 is pre-programmed with the number M of registration processes which the registrar 13 can handle simultaneously or in a period of time. The SBC 11 is configured to allow no more than M REGISTER messages to reach the registrar 13 in a rolling period. As an example, the SBC 11 may be configured to send no more than 100 REGISTER messages to the registrar 13 in one second.

If the SBC 11 determines that forwarding another REGISTER message would mean that more than M REGISTER messages have been sent to the registrar 13 in a period, the SBC 11 will not forward or will delay forwarding one or more of the REGISTER messages it receives. The SBC 11 thus protects the registrar 13 from being overloaded with REGISTER messages. This may prevent the registrar 13 from crashing as a result of receiving and/or trying to process too many REGISTER messages, while still ensuring that as many of the issued REGISTER messages as can be managed by the registrar 13 are sent to the registrar 13 to carry out registration.

The SBC 11 may be arranged to cache REGISTER messages for sending in the near future, and to discard REGISTER messages it receives that it cannot add to its cache (e.g. because the cache is full), or that it does not need to add to its cache (e.g. because the REGISTER message in question is a re-transmission of a REGISTER message that is currently cached or was until recently cached and has now been sent). The SBC 11 may process the cached REGISTER messages at regular intervals, and/or in response to particular triggers (e.g. when the number of REGISTER messages per second being received by the SBC 11 for forwarding towards the registrar 13 falls below a certain threshold).

If the SBC 11 has space to cache a REGISTER message, it may check whether that REGISTER message corresponds to (e.g. is a re-transmission of) any of the REGISTER messages which are already in the cache, or which were recently in the cache and have now been sent. This should prevent multiple REGISTER messages sent by one device from filling the cache and/or overloading the registrar 13.

If the SBC 11 does not cache a given REGISTER message and instead discards the REGISTER message, the SBC 11 may send a response to the device which sent the discarded REGISTER message, informing the device that the REGISTER message did not reach the registrar 13. The response may include "retry after" information (e.g. in a header of the response), telling the device how long it should wait before sending another REGISTER message.

Figure 2:
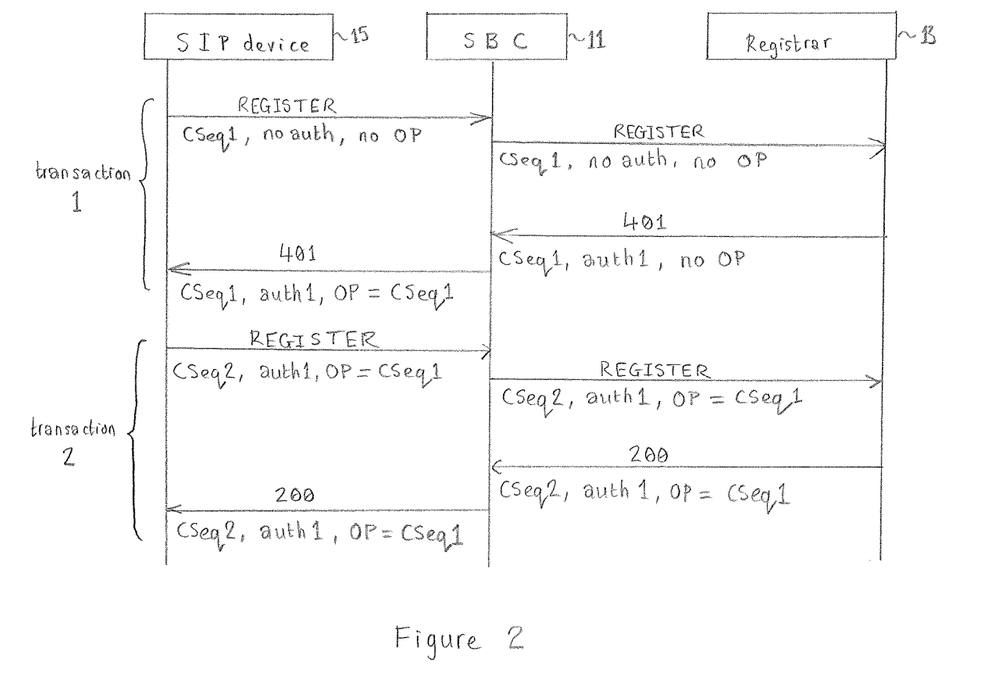
FIG. 2 schematically illustrates a registration process for a SIP device.

A registration process for one of the N SIP devices 15 is illustrated schematically in FIG. 2. In this example, SBC 11 determines that it can forward the first REGISTER message that the SIP device 15 sends (i.e. in the context of the example discussed above, the first REGISTER message is one of the 10% of REGISTER messages which are forwarded by the SBC).

The first REGISTER message (illustrated near the top of FIG. 2) is sent from the SIP device 15 towards registrar 13. The first REGISTER message has a command sequence ("CSeq") header, which includes a sequence number (an integer, identified as "CSeq1" in FIG. 2).

The first REGISTER message is received by the SBC 11 and forwarded to the registrar 13. The registrar 13 receives the first REGISTER message and determines that the REGISTER message does not include required authentication information (as indicated by "no auth" in FIG. 2).

In response to the first REGISTER message from the SIP device 15, the registrar 13 sends a "401" ("unauthorized") response towards the SIP device 15. The 401 response has a CSeq header including the same sequence number that was included in the first REGISTER message (CSeq1). The 401 response belongs to the same SIP transaction as the first REGISTER message (identified as "transaction 1" in FIG. 2).

The 401 response also includes authentication information for the SIP device 15 to use when it sends its next REGISTER message towards the registrar 13. The authentication information will be used to confirm the device's identity. The authentication information may include a number-used-once ("nonce") which the SIP device 15 can use to encrypt a password or similar in the future. The authentication information may specify a particular encryption method which should be used. The authentication information may be included in a "WWW-Authenticate" header of the 401 response.

The 401 response is received by the SBC 11. The SBC 11 is arranged to add an opaque parameter to 401 responses that it forwards. An opaque parameter is a parameter which can be added to a message packet in a header such as a "WWW-Authenticate" header or an "Authorization" header. It takes the form opaque=" ", with a character string between the speech marks. An opaque parameter may therefore provide an opportunity to include additional information in a packet. However, an opaque parameter can be ignored by software applications that do not need the information contained in it. A SIP message is expected to contain only one opaque parameter. Thus a parameter identified using opaque=" " should be the only such parameter in a SIP message.

In the simple example illustrated in FIG. 2, the opaque parameter that the SBC adds to the 401 response is the value of the command sequence number (CSeq1) of the 401 response, as a character string. The SBC 11 may achieve this by copying the sequence number (CSeq1) from the CSeq header of the 401 response and pasting it as an opaque parameter into a header of the message (e.g. the "WWW-Authenticate" header of the 401 response). In more complex examples (discussed further below), the SBC 11 may perform an operation using the current CSeq number or another CSeq number, e.g. by applying a function to the CSeq number, and paste the outcome of the operation into a header as the opaque parameter.

The SBC 11 forwards the 401 response, with the opaque parameter, to the SIP device 15. In the illustrated example, this completes transaction 1, which is the first of two transactions required to complete registration of the SIP device 15.

The SIP device 15 is arranged such that, when a response to a message it has sent includes an opaque parameter, at least the next message of the same kind that the SIP device 15 sends to the origin of the response (in this case, the registrar 13) will also include the opaque parameter. More specifically, when the SIP device 15 receives a "401" response with a "WWW-Authenticate" header that contains an opaque parameter, the SIP device 15 will use that same opaque parameter in the "Authorization" header of the subsequent REGISTER message that the SIP device 15 sends.

In some circumstances, the SIP device 15 may apply the opaque parameter to all of the packets it sends to the registrar 13 until it receives instructions to do differently. For instance, if one of the later messages the SIP device 15 receives from the registrar 13 does not include an opaque parameter or includes a new opaque parameter, the SIP device 15 may cease applying the old opaque parameter to its outgoing packets and, if appropriate, apply the new opaque parameter instead.

After receiving the 401 response from the SBC 11, the SIP device 15 sends a second REGISTER message towards the registrar 13. The second REGISTER message has a CSeq header including a new sequence number, identified as "CSeq2" in FIG. 2. The new sequence number CSeq2 is equal to the value of CSeq1 plus 1. This incrementing of the CSeq number for the second REGISTER message indicates that the second REGISTER message corresponds to a new SIP transaction (identified as "transaction 2" in FIG. 2), different from the first transaction.

The second REGISTER message also includes authentication information which enables the SIP device 15 to authenticate itself with the registrar 13. In the illustrated example, the authentication information is included in an "Authorization" header of the second REGISTER message. As discussed above, the authentication information included in the second REGISTER message may include or have been derived using authentication information which the registrar 13 sent to the SIP device 15 in the 401 response of transaction 1. For example, the authentication information included in the second REGISTER message may include a password which has been encrypted using a method and a nonce given by the registrar 13 in the 401 response of transaction 1. This is indicated with the text "auth1" in the 401 message of transaction 1 and the REGISTER message of transaction 2.

In accordance with the arrangement of the SIP device 15 discussed above, the second REGISTER message also includes the opaque parameter of the 401 response of transaction 2 ("CSeq1"). In the illustrated example, the opaque parameter is included in the "Authorization" header, along with the authentication information.

The second REGISTER message is received by the SBC 11. The SBC 11 is still monitoring the number of REGISTER messages that it forwards to the registrar 13 to ensure that the registrar 13 is not overloaded with REGISTER messages which it cannot process.

The SBC 11 is arranged to inspect the REGISTER messages it receives to determine whether the REGISTER messages include opaque parameters.

In some embodiments of the invention, the SBC 11 may be arranged to conclude that a REGISTER message follows a 401 response from the registrar 13 if the REGISTER message includes an opaque parameter. In such circumstances, the SBC 11 may prioritise that REGISTER message over REGISTER messages which do not include an opaque parameter.

In other embodiments, the SBC 11 may be arranged to check additionally, if it determines that a given REGISTER message does include an opaque parameter, whether the opaque parameter satisfies a particular condition. In the simple case where the opaque parameter added by the SBC 11 to the 401 response of transaction 1 is equal to the value of the sequence number (CSeq1) of the 401 response, the SBC 11 checks whether the opaque parameter of the REGISTER message is equal to the value of the sequence number of the REGISTER message minus 1 (i.e. CSeq2 minus 1). In a more complex case, a different check may be performed, as will be discussed in more detail below.

The SBC 11 may be arranged to conclude that the REGISTER message follows a 401 response from the registrar 13 if the outcome of the SBC's check is equal to an expected outcome. If the SBC 11 concludes that a REGISTER message does follow a 401 response from the registrar 13, the SBC 11 will prioritise that REGISTER message above other REGISTER messages which it determines do not follow a 401 response from the registrar. If it can forward the REGISTER message to the registrar 13 without overloading the registrar 13, it will do so.

In the example of FIG. 2, the SBC 11 determines that the REGISTER message of transaction 2 does indeed follow a 401 response from the registrar 13, because the value of the REGISTER message's opaque parameter is equal to the current CSeq value (CSeq2) minus 1. The SBC 11 may therefore prioritise the REGISTER message of transaction 2 over other REGISTER messages it has received, and sends the REGISTER message of transaction 2 to the registrar 13.

The registrar 13 receives the second REGISTER message and determines that the second REGISTER message includes the correct authentication information (which is based, as indicated by "auth1" in FIG. 2, on the information provided by the registrar 13 in the 401 response of transaction 1). The registrar 13 therefore determines that the SIP device 15 should be registered.

In response to the second REGISTER message, the registrar 13 sends a "200" ("okay") response towards the SIP device 15. The 200 response includes the sequence number CSeq2, indicating that it belongs to transaction 2 and is sent in response to the second REGISTER message. The 200 response may also include authentication information left over from the second REGISTER message (as indicated by "auth1" in FIG. 2), and the opaque parameter that was included with the second REGISTER message sent by the SIP device 15 towards the registrar 13 (as indicated by "OP=CSeq1" in FIG. 2), depending on the configurations of the SBC 11 and the registrar 13.

The 200 response is received by the SBC 11. Depending on the configuration of the SBC 11, it may leave the opaque parameter of the 200 response unchanged, remove the opaque parameter, or overwrite the opaque parameter with a different value. In the illustrated example, the SBC 11 leaves the opaque parameter unchanged, and forwards the 200 response to the SIP device 15. The SIP device 15 receives the 200 response. This completes transaction 2 (with sequence number CSeq2), and also completes the authenticated registration of SIP device 15 with registrar 13.

With the techniques described above, an SBC 11 may use an opaque parameter of a SIP message to differentiate between two different types of REGISTER messages. The SBC 11 may use the ability to differentiate between the different types of REGISTER message to prioritise REGISTER messages which are sent from SIP devices that have already been sent 401 responses from the registrar 13, i.e. SIP devices which are already part-way through a SIP registration process. This may help ensure that a SIP device 15 completes its SIP registration process once a REGISTER message it has sent has been received and responded to by the registrar 13. This may provide a better service for users of the SIP devices 15. It may also reduce network traffic by preventing SIP devices from having to re-send second REGISTER messages.

The invention may include the ability to differentiate REGISTER messages forming part of a re-registration process. Two further embodiments are described below with reference to FIGS. 3A and 3B. In these embodiments, one or more of the SIP devices 15 illustrated in FIG. 1 are arranged to send a further REGISTER message, at a later time, to begin a re-registration process. A SIP device 15 may for example be arranged to send a further REGISTER message a certain period of time after it completed its initial registration process (such as the registration process illustrated schematically in FIG. 2), or a certain period of time before its initial registration period expires. The period of time between completion of registration and commencement of re-registration (or between commencement of re-registration and the end of the initial registration period) may be chosen to allow sufficient time for the device to re-register before its initial registration period expires.

Figure 3A:
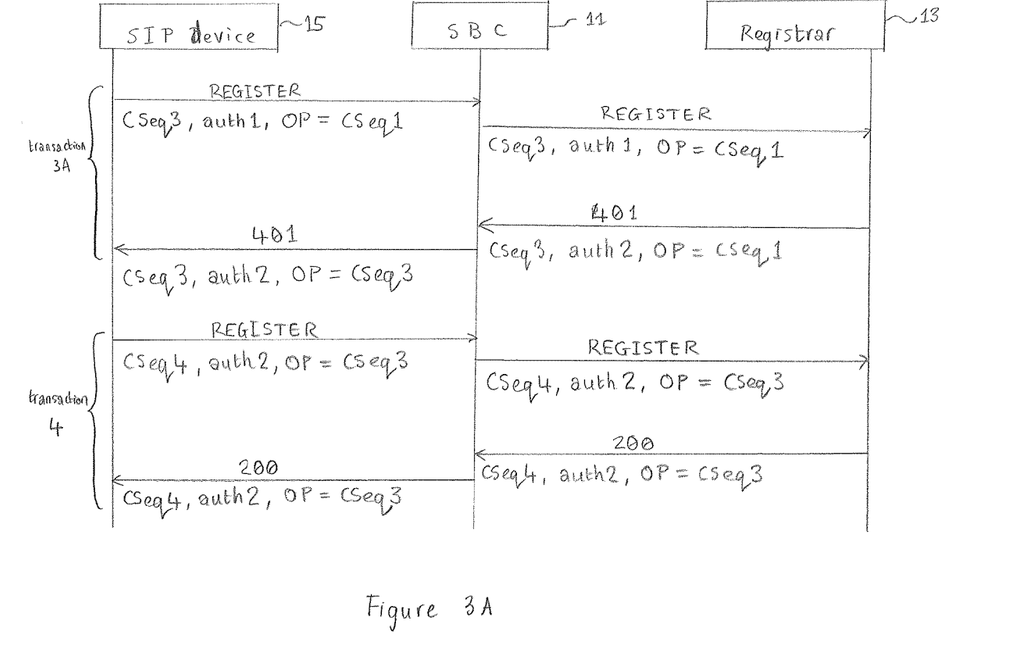
FIG. 3A illustrates a challenged re-registration process for a SIP device.
Figure 3B:
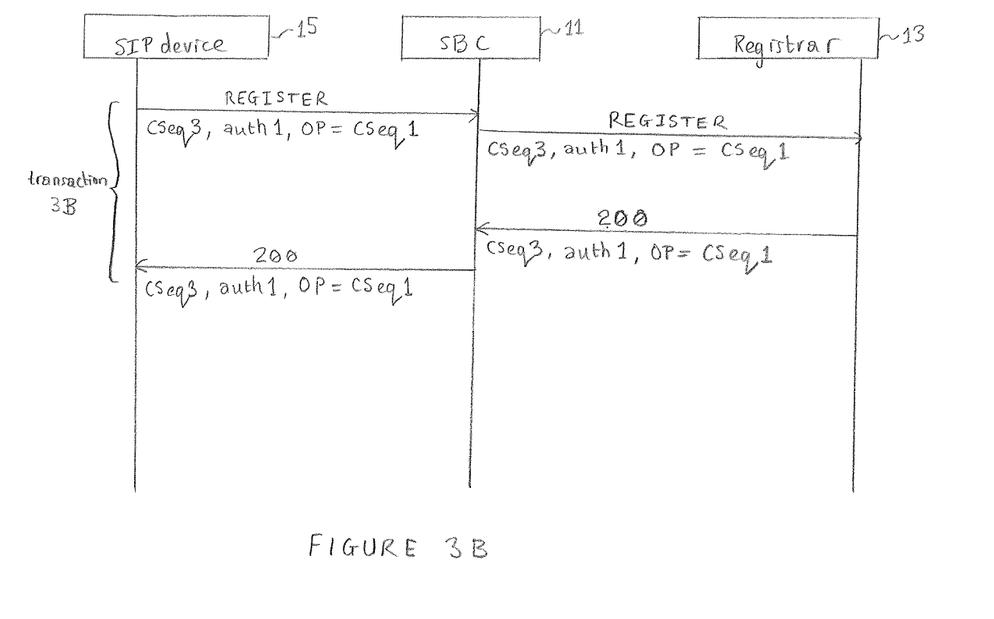
FIG. 3B illustrates an unchallenged re-registration process for a SIP device.

Two possible re-registration processes are illustrated schematically in FIGS. 3A and 3B. FIG. 3A schematically illustrates a "challenged" re-registration process. The challenged re-registration process is substantially similar to the initial registration process illustrated in FIG. 2.

The re-registration process of FIG. 3A begins with another REGISTER message, sent by SIP device 15 towards registrar 13. This begins a new SIP transaction (indicated as "transaction 3A" in FIG. 3A). The REGISTER message of transaction 3A (i.e. the REGISTER message that begins the re-registration process of FIG. 3A) has a command sequence (CSeq) header including a new sequence number, indicated by "CSeq3" in FIG. 3A. The value of CSeq3 is equal to the value of CSeq2 plus 1. The illustrated REGISTER message of transaction 3A also includes authentication information which is based on authentication information from the previous transactions (as indicated by "auth1" in FIG. 3A), and the opaque parameter from the previous transactions (as indicated by "OP=CSeq1" in FIG. 3A).

The REGISTER message of transaction 3A is received by the SBC 11. The SBC 11 is still monitoring the number of REGISTER messages that it forwards to the registrar 13 to ensure that the registrar 13 is not overloaded with REGISTER messages which it cannot process.

As explained above in relation to the REGISTER message of transaction 2, the SBC 11 is arranged to inspect the REGISTER messages it receives to determine whether the REGISTER messages include opaque parameters. The SBC 11 may be arranged to prioritise REGISTER messages that have opaque parameters, or to prioritise REGISTER messages whose opaque parameters satisfy a condition.

The REGISTER message illustrated in transaction 3A (FIG. 3A) does include an opaque parameter. Its opaque parameter satisfies a different condition from the condition satisfied by the opaque parameter of transaction 2's REGISTER message (FIG. 2). The opaque parameter of transaction 3A's REGISTER message is equal to its own CSeq number (CSeq3) minus 2. The opaque parameter of transaction 2's REGISTER message is equal to its own CSeq number (CSeq2) minus 1.

The SBC 11 can use these differences in different REGISTER messages' opaque parameters to differentiate between a REGISTER message which begins an initial registration process, such as the REGISTER message of transaction 1 (no opaque parameter); a REGISTER message which completes a registration process, such as the REGISTER message of transaction 2 (opaque parameter equal to current CSeq number minus 1); and a REGISTER message which initiates a re-registration process, such as the REGISTER message of transaction 3A (opaque parameter equal to current CSeq number minus 2).

In this example, the SBC 11 determines that it can forward the REGISTER message of transaction 3A to the registrar 13 without causing the registrar 13 to receive too many REGISTER messages in a period, and forwards the REGISTER message.

The registrar 13 receives the REGISTER message of transaction 3A and determines that the REGISTER message does not include the required authentication information. In the illustrated example, this is because the authentication information included in the REGISTER message (indicated by "auth1" in FIG. 3A) is not up to date. The registrar 13 therefore sends a 401 response towards the SIP device 15. The 401 response includes the CSeq number of the current transaction (CSeq3, for transaction 3A); new authentication information (indicated by "auth2" in FIG. 3A) for the SIP device 15 to use to authenticate itself with the registrar 13 in the future; and the opaque parameter that was included in the REGISTER message (CSeq1). As before, the authentication information may include instructions and/or a nonce for encrypting a password or similar in future messages.

The SBC 11 receives the 401 response from the registrar 13. The SBC 11 amends the opaque parameter, so that it is equal to the CSeq number of the transaction (CSeq3). The SBC 11 forwards the 401 message, with its amended opaque parameter, to the SIP device 15.

The SIP device 15 receives the 401 response from the SBC 11. The SBC 11 uses the authentication information included in the 401 response and sends a new REGISTER message with a new CSeq number (see "transaction 4", "CSeq4" and "auth2" in FIG. 3A) towards the registrar 13. The REGISTER message of transaction 4 includes the opaque parameter that was included in the 401 response (CSeq3 in the example of FIG. 3A).

The SBC 11 receives the REGISTER message of transaction 4. The SBC 11 inspects the opaque parameter of the REGISTER message and determines that it is equal to the current CSeq number (CSeq4) minus 1. The SBC 11 infers that the REGISTER message has been sent by a SIP device 15 which received a 401 response from the registrar 13. The SBC 11 determines that it can forward the REGISTER message of transaction 4 to the registrar 13 without exceeding the maximum number of REGISTER messages that can be sent in a period, and forwards the REGISTER message.

The registrar 13 receives the forwarded REGISTER message from the SBC 11. The registrar 13 determines that the REGISTER message includes the required authentication information (indicated by "auth2" in FIG. 3A) and sends a "200" ("okay") response towards the SIP device 15.

The SBC 11 receives the 200 response and forwards it to the SIP device 15. This ends transaction 4 illustrated in FIG. 3A and completes the re-registration of the SIP device 15. At a later time, the SIP device 15 may initiate another such re-registration process, which may proceed in a substantially similar way.

An alternative re-registration process is illustrated in FIG. 3B. The alternative re-registration process is an "unchallenged" re-registration process. The unchallenged re-registration process includes only one SIP transaction (indicated as SIP transaction 3B in FIG. 3B).

The alternative re-registration process begins with a REGISTER message sent by SIP device 15 towards the registrar 13. Like the REGISTER message that begins the challenged registration process of FIG. 3A, the REGISTER message of FIG. 3B includes previously-used authentication information (indicated by "auth1" in FIG. 3B) and the opaque parameter "CSeq1" from transactions 1 and 2.

The REGISTER message of transaction 3B is received by the SBC 11. The SBC 11 establishes that the REGISTER message includes an opaque parameter, and that the opaque parameter is equal to the current CSeq number (CSeq3) minus 2. The SBC 11 therefore prioritises the REGISTER message over some other REGISTER messages, and, if the SBC 11 determines that it can forward the REGISTER message to the registrar 13 without overloading the registrar 13, it forwards the message.

The registrar 13 receives the REGISTER message forwarded by the SBC 11. In this example, the registrar 13 determines that the SIP device 15 can be registered. This may be because, in the illustrated example of FIG. 3B, the registrar 13 is arranged such that it does not require new authentication information each time a SIP device 15 sends a message—a SIP device 15 which has registered previously may continue using old authentication information (e.g. for a certain period of time). In other embodiments, the registrar 13 may have alternative methods of verifying the identity of the SIP device 15 which is attempting to re-register.

The registrar 13 sends a "200" ("okay") response towards the SIP device 15. The 200 response is received and forwarded by the SBC 11, ending transaction 3B and completing the re-registration process of FIG. 3B.

Using the differences in opaque parameter between the different kinds of REGISTER message described above and illustrated in the figures, the SBC 11 can be arranged to prioritise the different types of REGISTER messages as an administrator of the system wishes.

The SBC 11 may for example be arranged to prioritise REGISTER messages which immediately follow 401 responses from the registrar 13 above all other kinds of REGISTER message. In the illustrated examples, these REGISTER messages have opaque parameters which are equal in value to the current CSeq number of the REGISTER message minus 1. Prioritising these REGISTER messages should mean that a registration process which is started is also completed as quickly as possible (i.e. once an initial REGISTER message from the SIP device has been forwarded by the SBC 11, the later REGISTER message, to complete registration, should be guaranteed to be forwarded by the SBC 11 as soon as possible).

After the REGISTER messages above, the SBC 11 may prioritise REGISTER messages which do not immediately follow 401 responses and which come from SIP devices that have not previously registered with the registrar 13. In the illustrated examples, these REGISTER messages have no opaque parameters (see, for example, transaction 1). The SBC 11 determines that these REGISTER messages have lower priority than the REGISTER messages discussed above (i.e. the REGISTER messages which immediately follow 401 responses).

The SBC 11 may then prioritise REGISTER messages which begin a re-registration process, i.e. REGISTER messages from SIP devices which have previously registered successfully and which are attempting to renew their registration with the registrar 13. In the illustrated examples, these REGISTER messages have opaque parameters which are equal in value to the current CSeq number of the REGISTER message minus 2. Prioritising these REGISTER messages after the other types of REGISTER message described above may provide the most consistent SIP registration service for the SIP devices, as a SIP device will typically initiate a re-registration process some time before its old registration is due to expire. Consequently, there may be time for other SIP devices which have not previously been registered to complete registration processes before the SIP devices which wish to re-register need to complete re-registration.

In other examples, the SBC 11 may be arranged to prioritise the REGISTER messages differently. For instance, in some circumstances, the administrator of the system may prefer to ensure that re-registration REGISTER messages are prioritised above other types of REGISTER message. This arrangement, possibly in combination with variable lengths of registration among the different SIP devices in a network, may help ensure that some SIP devices, once registered with the registrar 13, do not lose their registration if possible. This may for example be advantageous for particular VoIP phones within a network which are typically used for a larger number of calls (e.g. a main receptionist's phone) or for more important calls (e.g. a director's phone or site security phone) than other phones in the network, and whose registrations should therefore be prevented from expiring, if possible.

In the above examples, the SBC was pre-programmed with a number M of REGISTER requests which it was allowed to forward to the registrar 13 in a rolling period of time. This arrangement was intended to ensure that the SBC would always forward the maximum number of REGISTER messages that it could without causing the registrar 13 to crash. The SBC used this same criterion each time it received a REGISTER message from a SIP device to assess whether it could forward the REGISTER message to the registrar.

In other examples, the SBC might only apply such a criterion in times when it receives large numbers of REGISTER messages. The SBC might be controllable by an administrator of the network to enforce a different policy at different times. The number M of REGISTER messages which the SBC is allowed to forward to the registrar in a rolling period of time might be arranged to vary in time and/or be updated by an administrator of the system, or automatically e.g. in response to a network topology change.

Although in the illustrated examples an initial REGISTER message sent by a SIP device after a power cut or other event (such as the REGISTER message of transaction 1, FIG. 2) includes no authentication information, in other examples, such a REGISTER might include legacy information from before the power cut (or other event). Legacy authentication information might or might not be accepted by the registrar 13. If legacy authentication information is accepted by the registrar 13, the first REGISTER message sent by the SIP device after the power cut might lead to a registration process like the re-registration process illustrated schematically in FIG. 3B. If legacy authentication information is not accepted by the registrar 13 (which might be a preferred implementation), the first REGISTER message from the SIP device will lead to a registration process like the re-registration process illustrated schematically in FIG. 3A.

Similarly, an initial REGISTER message (or a later REGISTER message) might include a legacy opaque parameter, corresponding to an opaque parameter added by the SBC before the power cut. In the context of the registration processes illustrated in the figures, such an initial REGISTER message would be similar to the REGISTER message of transaction 3A, in that the difference between its CSeq number and its opaque parameter would be likely to be at least 2 (and possibly more). If the SBC is able to distinguish such a REGISTER message from the other kinds of REGISTER message, it might give them a different priority. Alternatively, these REGISTER messages might be prioritised in the same way that the re-registration REGISTER messages of transaction 3A are, or otherwise.

It is possible that a SIP message that arrives at an SBC might already have an opaque parameter which is unrelated to the opaque parameters described above, i.e. which is unrelated to the opaque parameters applied by the SBC and which has not been applied by the SBC. In such cases, the SBC may apply its own opaque parameter by overwriting the existing opaque parameter, or by inserting its own opaque parameter into the existing opaque parameter. The SBC may, for instance, prepend or append its own character string to the existing opaque parameter, or otherwise insert its character string into the existing opaque parameter string, e.g. by interposing its character string among the existing characters. The SBC may be arranged to use a particular format of character string or a signature for the opaque parameters it applies, so that opaque parameters applied by the SBC can be distinguished from other types of opaque parameter (bearing in mind the limitations of the opaque parameter in terms of available characters and bit-space for the corresponding message header).

Accordingly, the SBC may be arranged to examine opaque parameters of SIP messages it receives to determine whether there is a character string in the opaque parameter which it recognizes as meeting the required criterion or criteria (e.g. being of the particular format and/or having the signature discussed above). If the SBC examines an entire opaque parameter string of a SIP message and concludes that no portion or collection of characters of the opaque parameter string meets the required criterion/criteria, it may treat the message as if it has no opaque parameters, like the REGISTER message of transaction 1 (see FIG. 2). It may overwrite the existing opaque parameter, or insert an additional string of characters of its own into the existing opaque parameter.

Although in the examples described above the opaque parameter was set to be equal to the current CSeq header of the message to which it was being applied, in other examples the opaque parameter may instead be set to be the output of an operation performed on the current CSeq header of the message by the SBC. This may enhance the security of the system and help prevent SIP devices from altering the priority of their own messages by applying opaque parameters which might increase their priority over that of other messages. The operation might for example be a mathematical function or encryption algorithm applied to the current CSeq header. The operation might be a hash function. The SBC (which applies the opaque parameter to a message) knows the operation and uses that information to determine whether an opaque parameter included in a message received from a SIP device has the required relationship to the CSeq header.

While in the above examples the SBC 11 adds an opaque parameter to a 401 response (or updates the opaque parameter of a 401 response) so that the opaque parameter is equal to the current CSeq number (i.e. the CSeq number of that 401 response), in other examples, the SBC 11 may use a different number or string, such as the CSeq number of the next message/transaction (i.e. CSeq+1), when determining the opaque parameter to apply to the message. The SBC 11 may apply a function to the number/string it uses. In such cases, the SBC 11 will perform a corresponding check on REGISTER messages it receives (after forwarding the 401 response) to determine their priorities.

Some non-limiting examples of possible opaque parameters and corresponding checks are set out in the table below. The notation f(x) is used to denote a function f applied to an operand x. f−1 denotes the inverse of the function f (if an inverse exists).

| OPAQUE PARAMETER APPLIED (E.G. TO 401 MESSAGE) | CHECK PERFORMED ON OPAQUE PARAMETER (E.G. OF REGISTER MESSAGE) |
| --- | --- |
| current CSeq number | Equal to current CSeq number − 1? |
| current CSeq number + 1 | Equal to current CSeq number? |
| f(current CSeq number) | Equal to f(current CSeq number − 1)? |
| f(current CSeq number + 1) | Equal to f(current CSeq number)? |
| f(current CSeq number) | $f^{-1}$(OP) equal to current CSeq number − 1? |
| f(current CSeq number + 1) | $f^{-1}$(OP) equal to current CSeq number? |

The check may be performed as a comparison of two values. The SBC may, for example, subtract a value related to the CSeq number of the received message (such as the value of the current CSeq number itself) from a value related to the opaque parameter of the received message (such as the value of the opaque parameter itself), or vice versa. The SBC may determine the priority of the received SIP message based on the difference between the two values.

For example, the SBC may receive a SIP REGISTER message like the REGISTER message of transaction 2 (see FIG. 2). The SBC may determine that the difference between the opaque parameter and the CSeq number is "1", and give the message a priority based on that value. Analogously, the SBC may receive a SIP message like the REGISTER message of transaction 3A (see FIG. 3A), and may perform a similar comparison. The SBC may determine that the difference between the opaque parameter and the current CSeq number for the REGISTER message of transaction 3A is "2", and give the message a priority based on that value. The SBC may contain a list of possible differences between opaque parameter and CSeq number, with corresponding priorities.

In some examples, the SBC might use a look-up table stored at the SBC to determine whether the opaque parameter of a received message matches an expected value for that message (e.g. based on an entry in the look-up table for the particular CSeq number of the message).

Using a function when deriving an opaque parameter to apply to a SIP message (such as a 401 response) may make it difficult for a SIP device to "spoof" an opaque parameter which meets the criterion/criteria applied by the SBC when it inspects opaque parameters of received messages. This may prevent the SIP device from increasing the priority of the SIP message(s) that it sends. It may therefore be that preferred embodiments of the invention include use of a function such as a cryptographic function which a SIP device does not know and cannot determine from an opaque parameter of a received message. The cryptographic function may involve the use of nonces so that the encryption of opaque parameters changes between SIP transactions.

Alternatively or additionally, the function which is used to derive an appropriate opaque parameter for SIP messages may change over time. This may provide improved security in that, even if a third party discovers what function is being used by the SBC at one time and uses the function to raise the priorities of its own devices' registration processes, the third party will not be able to keep doing so indefinitely, as the function will change.

Although in the examples described above the SBC 11 adds opaque parameters to (or updates opaque parameters of) 401 responses which are received from the registrar 13 and forwarded to a SIP device 15, the SBC might alternatively add or update the opaque parameter of a REGISTER message which it receives from a SIP device and forwards to the registrar. For example, in the case of transaction 1 (FIG. 2), the SBC 11 might add an opaque parameter equal to the current CSeq number (CSeq1) to the REGISTER message it forwards to the registrar 13. The registrar 13 would then include the opaque parameter CSeq1 in the 401 response it sends towards the SIP device 15, via the SBC 11 (which leaves the opaque parameter unchanged). The SIP device 15 would then include the same opaque parameter in the REGISTER message of transaction 2.

In some examples, the SBC 11, the SIP devices 15 and/or the registrar 13 might remove authentication information and/or an opaque parameter if it has been used once for its intended purpose. For example, in embodiments in which it is only desired to differentiate between a REGISTER message from a device which has just received a 401 response from the registrar 13 (such as the REGISTER message of transaction 2), and REGISTER messages from devices which have not just received a 401 response from the registrar 13 (such as the REGISTER messages of transactions 1 and 3A/3B), the SBC 11 may remove an opaque parameter from a REGISTER message if it (the SBC) determines that it added the opaque parameter to a 401 message preceding the REGISTER message and that the REGISTER message should therefore be prioritised.

In other words, in a modified version of the registration process of FIG. 2, the SBC 11 might add the opaque parameter to the 401 response of transaction 1, as illustrated, and then remove the opaque parameter from the REGISTER message of transaction 2 when it (the SBC 11) forwards the REGISTER message to the registrar 13. In this example, it would do this because, by the time the SBC 11 forwards the REGISTER message of transaction 2, the SBC 11 has used the opaque parameter for its intended purpose, i.e. identifying whether the REGISTER message should be prioritised or not. Removing the opaque parameter at that point may reduce the processing burden on the registrar 13, since the registrar 13 does not then have to read and re-apply an opaque parameter to the "200" response it sends to the REGISTER message of transaction 2. In this example, the SIP device 15 would also not need to apply an opaque parameter to a subsequent REGISTER message it sends to initiate a re-registration process (although it would add an opaque parameter to the second REGISTER message in the re-registration process, since the SBC 11 would have added an opaque parameter to the 401 response of the first re-registration transaction).

Analogously, the registrar 13 might not include authentication information in a 200 response it sends towards a SIP device 15, since the authentication information might not be required any further. Similarly, a SIP device 15 which is attempting to re-register itself with the registrar 13 might not include any authentication information in a REGISTER message it sends to begin re-registration (such as the REGISTER message of transaction 3A) if it knows that it will need new authentication from the registrar 13 (i.e. that the registrar 13 enforces challenged authentication and time-limits the validity of authentication information it issues).

Although the above examples have been described in terms of REGISTER messages exchanged between SIP devices and a registrar (and the other SIP messages involved in a SIP registration procedure), the methods are equally applicable to other SIP procedures, such as SUBSCRIBE or NOTIFY procedures, sent to an appropriate subscription/notification application running on a server. Moreover, the above-described apparatus and techniques may be used to prioritise messages of mixed types. For example, a second REGISTER message in an authenticated registration process may be prioritised over a first SUBSCRIBE message in an authenticated subscription process in a situation where a server which is responsible for processing both registration and subscription processes has limited resources.

Determining a priority of a received SIP message may involve determining a priority of the message based on information (e.g. parameters such as an opaque parameter or a sequence number) included in the message. The priority may be used to determine whether the message should be forwarded or discarded by an SBC.

The priority may be one of two or more different priorities which a SIP message may be assigned by the SBC. For example, there may be a "high" priority and a "low" priority, and possibly other priorities. An SBC may, depending on its configuration, always forward high-priority messages if doing so would not overload the receiving device. The SBC may have a maximum threshold of messages forwarded in a period of time which cannot be exceeded, even by high-priority messages. Thus even if a high-priority message is received at the SBC, the SBC may not forward the high-priority message if it has already forwarded a number of messages equal to the maximum threshold in the last period of time.

The SBC may also have a lower threshold. The SBC may be arranged to forward low-priority messages only if a number of messages it has forwarded in a rolling period is below the lower threshold. This may help ensure that there is usually capacity to send high-priority messages and that low-priority messages do not ever prevent high-priority messages from being sent.

Alternatively or additionally the SBC may have one or more caches in which it may store messages for forwarding in the future. The SBC may use the priorities it determines to sort received messages into the caches for forwarding in the future.

The priorities may therefore in at least some examples be "absolute" priorities. The absolute priorities may be determined based on absolute, possibly pre-defined, criteria, such as whether a REGISTER message is being sent in response to a 401 response from a registrar, whether the message is a first REGISTER message in a re-registration process, etc.

However, the absolute priorities may be used to determine or indicate the relative priorities of the received messages, i.e. the priorities of the messages relative to each other. In some cases, a plurality of messages may be received at the SBC, and the SBC may determine that they are all high-priority messages and therefore equal in priority. In other cases, a plurality of messages may be received at the SBC, and the SBC may determine that one of the messages is a high-priority message, one is a medium-priority message, and another is a low-priority message, and therefore that the messages have different relative priorities. The SBC may forward one or more of the messages, and discard or cache one or more of the others, on the basis of their priorities.

The SBC may be arranged to analyses the priorities of received SIP messages after it has performed other checks on the received SIP messages. For example, the SBC may check the IP address from which a received packet has been sent to determine whether the IP address is in a "blacklist" of IP addresses from which packets should not be forwarded to the registrar. The SBC may additionally or alternatively perform a virus scan on received SIP messages before their priorities are analyzed. This may mean that one or more SIP messages received by the SBC do not have their priorities determined by the SBC, because they are found to have come from blacklisted IP addresses, or because they are found to contain viruses.

The SBC includes a reader arranged to read opaque parameters of received SIP messages. The reader may comprise a processor arranged to execute computer program code which, when executed by the processor, allows the processor to read and possibly perform other operations on an opaque parameter included in a SIP message.

The SBC also includes a determiner arranged to determine priorities of received SIP messages. The determiner may comprise a processor arranged to execute computer program code which, when executed by the processor, allows the processor to determine a priority of a received SIP message based on the opaque parameter included in the SIP message. This processor may be the same processor as described above in the context of the reader, or a different processor.

The SBC also includes a controller arranged to control forwarding of received SIP messages based on determined priorities of the SIP messages. The controller may comprise a processor arranged to execute computer program code which, when executed by the processor, allows the processor to control forwarding a received SIP message based on a determined priority of the SIP message. This processor may be the same processor as described above in the context of the reader and/or the determiner, or a different processor.

What is claimed is:

1. A method for prioritising forwarding of SIP messages in a network element, comprising the steps of:
   reading an opaque parameter of a received SIP message, the opaque parameter being related to one or more of a command sequence (CSeq) number of the received SIP message and a CSeq number of a further SIP message;
   determining a priority of the received SIP message using the outcome of a comparison, the comparison being based on the opaque parameter of the received SIP message and a further parameter of the received SIP message;
   wherein the further parameter is a CSeq number of the received SIP message; and
   controlling forwarding of the received SIP message based on the determined priority.

2. The method as claimed in claim 1, wherein the comparison comprises comparing two of: the opaque parameter; the further parameter; an outcome of an operation performed on the opaque parameter; and an outcome of an operation performed on the further parameter.

3. The method as claimed in claim 1, further comprising determining whether to cache the received SIP message based on the priority of the received SIP message.

4. The method as claimed in claim 1, further comprising controlling forwarding of a plurality of received SIP messages based on priorities of the received SIP messages.

5. The method as claimed in claim 1, further comprising applying an opaque parameter to an outbound SIP message based on a CSeq number of the outbound SIP message.

6. The method as claimed in claim 1, performed by a session border controller.

7. An apparatus for prioritising forwarding of SIP messages, including:
   a reader arranged to read an opaque parameter of a received SIP message, the opaque parameter being related to one or more of a command sequence (CSeq) number of the received SIP message and a CSeq number of a further SIP message;
   a determiner arranged to determine a priority of the received SIP message using the outcome of a comparison, the comparison being based on the opaque parameter of the received SIP message and a further parameter of the received SIP message;
   wherein the further parameter is a CSeq number of the received SIP message; and
   a controller arranged to control forwarding of the received SIP message based on the determined priority.

8. The apparatus as claimed in claim 7, wherein the comparison comprises comparing two of the opaque parameter; the further parameter; an outcome of an operation performed on the opaque parameter; and an outcome of an operation performed on the further parameter.

9. The apparatus as claimed in claim 7, further comprising a cache, wherein the apparatus is arranged to determine whether to cache the received SIP message based on the priority of the received SIP message.

10. The apparatus as claimed in claim 7, wherein the controller is further arranged to control forwarding of a plurality of received SIP messages based on priorities of the received SIP messages.

11. The apparatus as claimed in claim 7, wherein the apparatus is further arranged to apply an opaque parameter to an outbound SIP message based on a further parameter of said outbound SIP message, wherein the further parameter of said outbound SIP message is a CSeq number of the outbound SIP message.

12. The apparatus as claimed in claim 7, wherein the apparatus is a session border controller.

13. A non-transitory computer-readable storage medium encoded with instructions which, when executed by a processor, enable a network element to carry out a method for prioritising forwarding of SIP messages, comprising the steps of:
   reading an opaque parameter of a received SIP message, the opaque parameter being related to one or more of a command sequence (CSeq) number of the received SIP message and a CSeq number of a further SIP message;
   determining a priority of the received SIP message using the outcome of a comparison, the comparison being based on the opaque parameter of the received SIP message and a further parameter of the received SIP message;
wherein the further parameter is a CSeq number of the received SIP message; and
controlling forwarding of the received SIP message based on the determined priority.

* * * * *